Patented July 15, 1924.

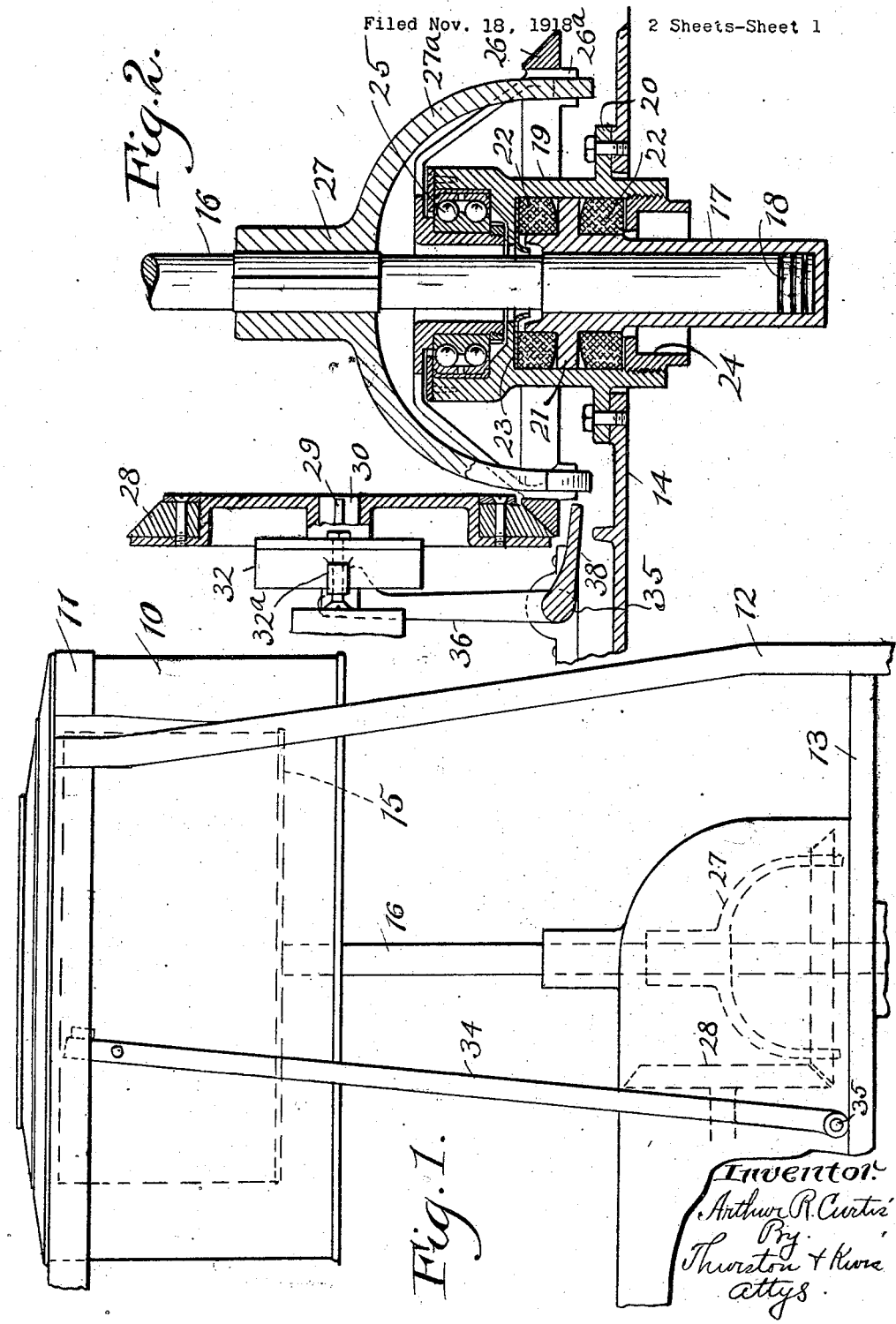

1,501,163

UNITED STATES PATENT OFFICE.

ARTHUR R. CURTIS, OF CLEVELAND, OHIO.

EXTRACTOR DRIVE MECHANISM.

Application filed November 18, 1918. Serial No. 262,965.

*To all whom it may concern:*

Be it known that I, ARTHUR R. CURTIS, a citizen of the United States, residing at Cleveland, in the county of Cuyahoga and State of Ohio, have invented a certain new and useful Improvement in Extractor Drive Mechanism, of which the following is a full, clear, and exact description.

This invention relates to improved driving mechanism for a centrifugal extractor or similar machines of the centrifugal type.

One of the objects of the invention is to provide driving mechanism by which the shaft may be operated at a very high speed, and in such manner that the shaft may gyrate or "wobble" without interfering with or being affected by the action of driving members.

Additionally the invention aims to provide an improved drive of the friction gear type, with provision for making and breaking the driving engagement between the friction gears and the application of a brake to stop the rotation of the shaft when the gears are disengaged, the whole operating smoothly and efficiently without causing undesirable end thrust on the driving motor on whose shaft a shiftable friction gear is preferably mounted.

The above and other objects are attained by my invention which may be briefly summarized as consisting in certain novel details of construction and combinations and arrangements of parts which will be described in the specification and set forth in the appended claims.

Figure 3:
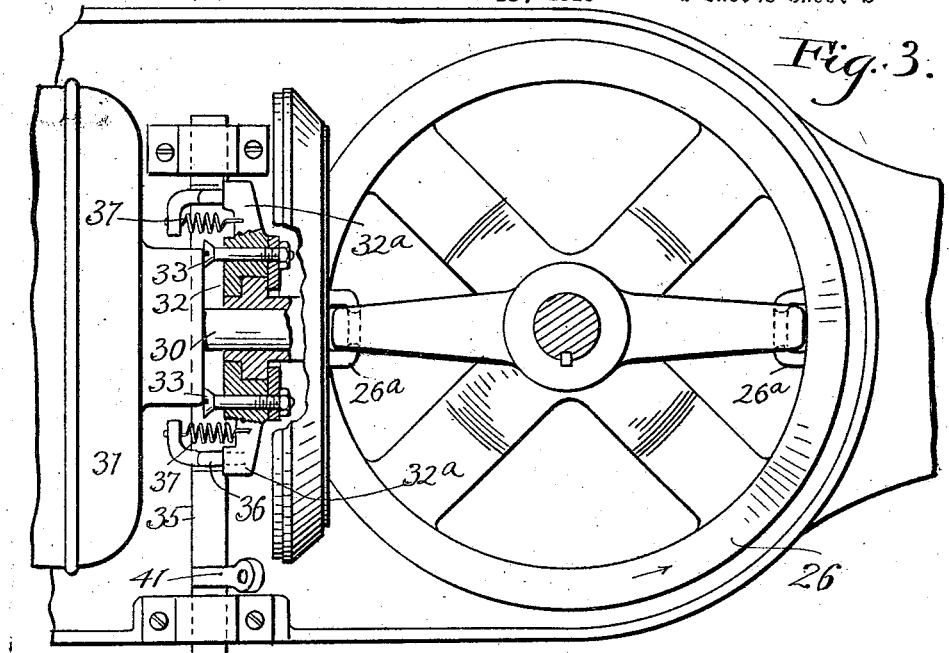
Figure 4:
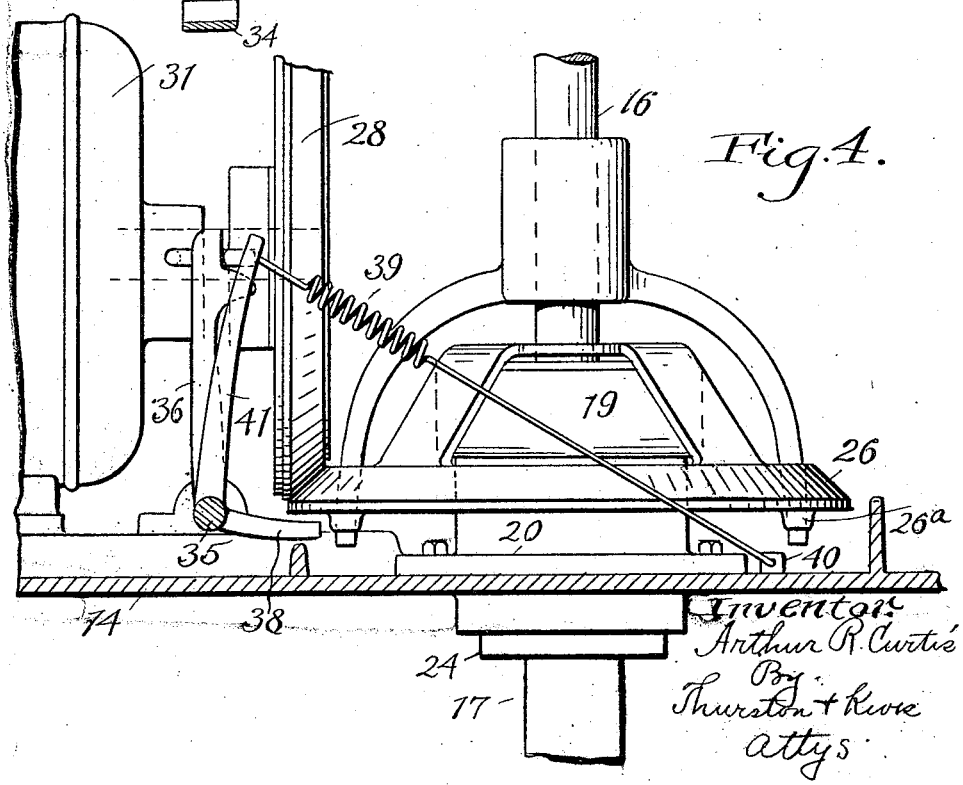

In the accompanying sheets of drawings wherein I have illustrated the preferred embodiment of the invention, Fig. 1 is a side view of the extractor, including a portion of the driving mechanism, which is indicated by dotted lines; Fig. 2 is a vertical sectional view through the mounting and driving mechanism for the extractor shaft; Fig. 3 is a plan view of the driving mechanism with the shaft in section and with other parts broken away for the sake of clearness; and Fig. 4 is a side view of the same with the base on which the mechanism is mounted, shown in section.

The machine to which I have applied my invention is an extractor intended primarily for drying clothes or other fabrics which have been washed, and it may, and preferably does form a part of a combined washer and extractor forming the subject matter of a companion application Serial No. 262,963 filed by me of even date herewith, although the invention has utility in a machine employed independently of the washer, and doubtless with other types of separating or centrifugal machines.

The separator here shown, includes a cylindrical curb or outer casing 10, into which the water, separated from the rotating articles is thrown, this curb being mounted in a suitable frame-work, a portion of which is shown, and including a circular strap 11, clamped about the top part of the curb and any other suitable frame members which may include uprights or legs 12, and preferably also, lower frame members 13, the purpose of which among other things, is to support a base or platform 14 constituting the support for the motor, and in fact, the entire extractor driving mechanism as well as the extractor shaft and the part carried by it.

Adapted to be rotated at high speed inside the curb is a perforated basket or bowl 15, which may be of any suitable construction. This basket is mounted on an extractor shaft 16 which extends freely through the bottom of the curb, through, and a short distance below the base 14, as shown in Fig. 2.

Taking up now, the construction of the mounting and the driving mechanism for the extractor shaft 16, it will be observed by reference particularly to Fig. 2, that the lower end of the shaft is seated in a cylindrical bearing 17, between the bottom of which and the lower end of the shaft are a series of thrust buttons 18. This bearing 17 extends up into a stationary cylindrical bearing housing 19, having an external flange 20 bolted to the base 14. Near the upper end of the bearing member 17 and extending outward substantially to the cylindrical wall of the housing 19 is a flange 21, and on opposite sides of the flange are yieldable supports for this bearing member 17, consisting preferably of rubber disks 22, clamped between a flange 23 extending inwardly from the housing 19 above the uppermost yieldable disk 22, and an adjustable flanged sleeve 24 screwed into the bottom of the housing 19. The flange 23 has an opening somewhat larger than the shaft, and the flanged sleeve 24 has an opening through which the shaft bearing 17 freely extends, the clearance provided by these openings being sufficiently large to permit unrestrained wobbling of the shaft and its immediate bearing 17.

This construction allows the shaft and its bearing 17 to gyrate or wobble about a point in the axis of the shaft, and in a line or in a transverse plane passing through the middle of the flange 21.

Mounted in the upper part of the housing 19 is a ball and ring bearing which is designated as a whole by the reference character 25, and this bearing supports one of the driving members for the extractor shaft, which in this instance is in the form of a bevel friction wheel 26. This bearing 25 allows the friction wheel 26 to rotate freely about the normally vertical axis of the extractor shaft 16, but not with a wobbling or gyrating action; that is to say, it has a true rotary motion about a fixed axis.

In order that the rotation of this friction wheel 26 may be imparted to the extractor shaft 16, without interfering with its gyratory motion (the extent of which, as is well known, depends upon the degree of unbalancing of the load in the extractor basket 15) a flexible driving connection is provided between the friction driving wheel and the shaft. For this purpose I provide fixedly on the shaft 16, above the bearings and above the friction driving wheel 26, a driving yoke 27 with a fork composed of a pair of diametrically opposite downwardly extending curved or rounded arms 27[a] having rounded or cylindrical curved lower ends engaging in diametrically opposite slots on the inner periphery of the wheel 26. These slots are formed by pairs of inwardly extending lugs 26[a], the inner sides of which are engaged by the lower ends of the arms whose sides are made at these points cylindrical.

The lugs 26[a] which receive the lower ends of the arms are opposite the flange 21 of the shaft supporting bearing 17, and the points of contact between the lower ends of these arms and the sides of the lugs or slots which receive them, are substantially in a plane at right angles to the shaft axis and passing through the center of gyration of the shaft, and this condition exists regardless of the position of the shaft while undergoing gyration. This construction permits the shaft to wobble in every direction, or to have an unrestrained gyratory action which is not influenced in any way by the rotary motion imparted to it by the driving wheel 26, nor does it interfere with the action of the driving members, and in these respects this mounting and driving connection is superior to all other constructions of which I am aware for this general purpose.

Rotary motion is transmitted to the friction wheel 26 by a second bevel friction wheel 28 which is preferably mounted directly on, and connected through a feather-key 29 to the shaft 30 of an electric driving motor 31, which is likewise mounted on the support 14, which as before stated, carries the extractor shaft.

This friction wheel 28, which is capable of slight axial movement toward and from the bevel surface of the friction wheel 26, to move it into and out of frictional engagement therewith, has mounted on its hub a box 32 having a pair of adjustable stops or abutments 33, preferably in the form of screws, whose outer ends are designed to engage the frame of the motor to limit the outward axial movement of the friction wheel 28 to an amount not exceeding the normal end play of the motor shaft, as will be subsequently explained.

To control the axial movement of the wheel 28, a hand lever 34 is provided, this lever at its lower end being secured to a rock shaft 35, and at its upper end, which is near the top of the machine, having a limited range of movement in a guide-way provided for that purpose behind the frame member 11 which the lever frictionally engages.

The rock shaft 35, which is mounted in suitable bearings on the base 14, has a pair of upstanding arms 36, which are adapted to engage extensions or wings 32[a] projecting laterally from the box 32 on the hub of the wheel 28, so as to positively move the wheel 28 toward the wheel 26 when the controlling handle or lever 34 is shifted to the right as viewed in Fig. 1.

These upstanding arms or levers 36 of the rock shaft are connected to the extensions 32[a] of the box by springs 37, which pull the friction wheel 28 away from the wheel 26 when the hand lever 34 is moved to the left as viewed in Fig. 1, but they allow continued movement of the arms 36, away from the wheel 28 after the abutments 33 which limit the outward movement of the wheel 28 engage the motor frame. This continued movement of the rock shaft 35 is desired in order that a brake-shoe 28 which is mounted on the rock shaft 35 may engage the under side of the friction wheel 26 so as to quickly stop the rotation of the extractor shaft 16 when the friction wheels are disengaged.

Though the arms 36, on the rock shaft, are designed to positively engage the lateral wings or extensions of the box connected to the hub of the friction wheel, the wheel 28 is ordinarily moved into engagement with the wheel 26 by a spring 39, which also holds the wheels yieldingly in engagement. This spring is connected at one end to a lug 40 on the base 14, and at its other end is connected to an arm 41 secured to the rock shaft 35.

The action of the spring 39 in moving the wheel 28 into engagement with the wheel 26, and in holding the wheels in engagement, is not unretarded, for I prefer that the upper end of the hand lever 34 frictionally engage the under side of the frame of the machine both as it is being moved to operative position and when it is in full on position. The effect of this is to impose a retarding or dash pot effect on the spring 39, the advantage of which is to prevent the spring 39 pulling the wheel 28 into depressions which may be formed in one or the other of the friction surfaces and thus preventing the formation of irregularities on one or both members which are frequently produced by the unrestrained or unretarded action of a spring in holding two friction wheels in driving engagement.

Therefore it will be seen that when the hand lever is moved to the left, as viewed in Fig. 1, to stop the machine, the arms 36 on the rock shaft move away from the extensions of the box on the hub of the wheel 28, but this movement through the springs 37 pulls the wheel 28 out of engagement with the wheel 26, shifting it in the direction stated, until the screws engage the motor frame, but continued movement of the hand lever in the same direction applies the brake. On the other hand, when the hand lever is moved to the right to start the machine, in which event the hand lever is first disengaged from behind a holding lug in the guide-way at the upper end of the frame, and then allowed to be moved forwardly to operating position by the action of the spring 39, (assisted by the hand of the operator if the pull exerted by the spring is not sufficient to overcome the frictional resisting action of the lever) the first effect of this movement is to release the brake, and when the arms 36 engage the extensions of the box 32, the wheel 28 is moved into engagement with the wheel 26 and is held in engagement therewith by the spring 39, under the restraining action of the hand lever as before explained, and for the purpose stated.

It was previously stated that the friction wheel 28 is connected to the motor shaft through a feather-key, but that the axial movement of the wheel did not exceed the normal end play of the motor shaft. Though this feather-key connection is preferred in practice, once the wheel 28 is set and adjusted and the limiting screws are adjusted, it does not slide along the motor shaft to start or stop the extractor shaft, but the slight movement necessary for this purpose is obtained by the endwise movement of the shaft itself, hence the provision of the stop abutments 33 which limit the axial movement of the wheel 28 so that it will not exceed the normal end play of the motor. This feature renders it possible in a practical and commercial sense to mount the movable gear or friction wheel 28 directly on the motor shaft, for if the movement of the wheel were greater than the normal end play of the motor, end thrust would be created on the motor shaft, which would seriously affect its operation and render it uncertain in action, and otherwise adversely affect it.

In conclusion it should be noted that the mounting for the extractor shaft and the arrangement of the driving mechanism are such that a construction of simple but exceedingly efficient design is provided. Not only does practice show that the extractor shaft can be rotated at very high speed with the expenditure of little power derived from a small motor, but the shaft may gyrate so freely that it produces practically no vibration in the machine as a whole. In addition the extractor is controlled, i. e. started and stopped, easily, quickly and with certainty. In other words the construction is of such design that it readily lends itself to embodiment in centrifugal machines for many specific purposes, and especially for use in an extractor, or a combined washer and extractor for household use.

Though I have shown only the preferred embodiment of my invention, changes may be made in details of construction or arrangement without departing from the principle of my invention, and I aim in my claims to cover all such changes or modifications which do not involve a departure from the spirit and scope of my invention in its broadest aspects.

Having described my invention, I claim:

1. In a centrifugal machine, a high speed shaft having a mounting which permits the shaft to gyrate, and which yieldingly opposes lateral movement thereof, a driving member surrounding the shaft and a member connected to the shaft and having a driving connection with the driving member in a plane in which the center of gyration of the shaft is located or substantially located.

2. In a centrifugal machine, a rotary shaft supported so that it may have a gyratory movement, means yieldingly resisting lateral movement thereof, a driving member extending about the shaft and rotating about a substantially fixed axis, and a movement transmitting member connected to the shaft and engaging said driving member substantially in a plane passing through the center of gyration.

3. In a machine of the character described, a shaft having a bearing which permits said shaft to gyrate, a friction driving wheel surrounding the shaft and mounted to rotate about a fixed axis, said friction wheel having a flexible connection with said shaft, a second friction wheel adapted to engage said first named friction wheel to rotate the same, means for moving said second wheel into and out of engagemenet with the first named wheel, and a brake connected to said wheel moving means so as to be applied when the wheels are separated.

4. In a machine of the character described, a normally vertical shaft having a bearing which permits said shaft to gyrate, a driving wheel surrounding the shaft and having a bearing which permits said wheel to rotate about a fixed axis, said wheel having a driving connection with the shaft, a driving motor having a shaft mounted for predetermined end play, a driving wheel mounted on said shaft, means for shifting said second wheel into and out of engagement with the first wheel, and means for limiting the axial movement of said second wheel to an amount having a predetermined relation to the end play of the motor shaft.

5. In a machine of the character described, a normally vertical shaft mounted for gyratory movement, a driving wheel surrounding the shaft and having a driving connection therewith, a driving motor, a driving wheel on the motor shaft, a thrust device for moving said second wheel so as to cause engagement of the latter with the first wheel, and a yieldable connection between said thrust device and the second wheel for causing disengagement.

6. In a centrifugal machine, a normally vertical shaft yieldingly mounted for gyratory movement, a friction driving wheel surrounding the shaft and connected to the latter to rotate the same, a second friction wheel adapted to engage the first to drive the same, a brake adapted to engage the first named friction wheel, and means for shifting said second wheel and brake, said shifting means acting when starting the shaft to first release the brake and then cause engagement between the wheels, and when stopping the shaft to separate the wheels and then apply the brake.

7. In a centrifugal machine, a rotary shaft, a pair of friction wheels, one surrounding and connected to the shaft and the other adapted to be moved into and out of engagement with the first, a brake, and means for controlling the brake and the movement of the second wheel, comprising a manually movable member connected to the brake and to said second wheel, the connection between said member and the wheel being yieldable whereby the brake may be moved independently of the wheel.

8. In a centrifugal machine, a rotary shaft, a pair of friction wheels for driving the shaft, one of said wheels being movable toward and from the other, a brake adapted to stop the rotation of the shaft when the wheels are disengaged, and controlling means for said second wheel and brake, said controlling means being spring operated when the brake is being released and the wheels are caused to engage.

9. In a centrifugal extracting machine, a shaft, means comprising a pair of friction drive wheels for driving said shaft, one of said wheels adapted to be moved into and out of engagement with the first, means comprising a spring for causing engagement between the wheels and for holding them yieldingly in engagement, and means acting on said spring to yieldingly resist the movement of said wheel under the action of the spring.

10. In a centrifugal extractor, a shaft, a bearing for the shaft, means comprising a pair of friction driving wheels for rotating the shaft, one of the wheels being movable into and out of engagement with the other, means for controlling the movement of said movable wheel toward and from the second comprising a spring acting to hold the wheels in engagement, and a manually movable controlling member yieldingly resisting the movement of the second wheel under the action of the spring.

11. In a centrifugal machine, a high speed shaft having a mounting which permits the shaft to gyrate and yieldingly opposes lateral movements thereof, a driving member coaxial with the shaft when the shaft is in normal position, and a driving connection between the driving member and shaft comprising parts on the driving member and shaft which engage each other in a plane which is normal to the axis of the shaft and in which the center of gyration of the shaft is located or substantially located.

In testimony whereof, I hereunto affix my signature.

ARTHUR R. CURTIS.